March 3, 1931. L. G. SIMJIAN 1,795,051
POSE REFLECTING SYSTEM FOR PHOTOGRAPHIC APPARATUS
Filed July 26, 1928
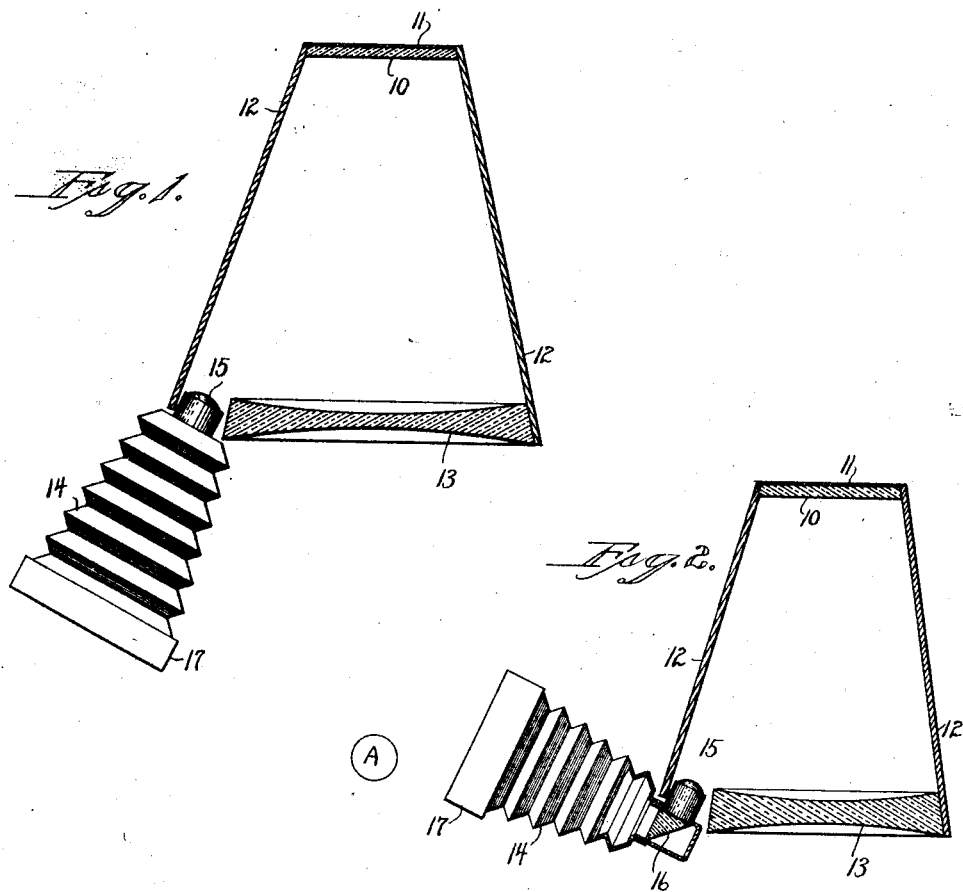

Patented Mar. 3, 1931

1,795,051

UNITED STATES PATENT OFFICE

LUTHER G. SIMJIAN, OF NEW HAVEN, CONNECTICUT

POSE-REFLECTING SYSTEM FOR PHOTOGRAPHIC APPARATUS

Application filed July 26, 1928. Serial No. 295,564.

This invention relates to an improvement in pose-reflecting systems for photographic apparatus and particularly to pose-reflecting systems designed for use in connection with automatic and semi-automatic photographic machines, though not so limited.

The object of this invention is to provide a pose-reflecting system for photographic apparatus which will enable a person being photographed to observe before his photograph is taken, a reduced-scale reflection of substantially the identical image which a camera will record when operated, so that he may be guided in assuming a pose suitable to his taste.

With this object in view my invention consists in a pose-reflecting system for photographic apparatus characterized by a pose-reflecting mirror, an image-reducing lens positioned between the poser and the said mirror, and a camera having its lens-system directed at the said mirror to photograph the image reflected therefrom, whereby a poser may observe in the mirror a reduced-scale reflection of the image which the said camera will record from the said mirror.

My invention further consists in a pose-reflecting system characterized as above and having certain other details of construction and combinations of parts as will be hereinafter described and particularly recited in the claims.

In the accompanying drawings:

Fig. 1 is a schematic sectional view showing one form which my invention may assume; and Fig. 2 is a corresponding view illustrating another form which my invention may assume.

In carrying out my invention as shown in Fig. 1, I employ a pose-reflecting mirror 10 preferably made of glass having a reflecting-coating 11 and located at the rear end of a tapered hood 12 at the front end of which I position an image-reducing lens 13, commonly called a "minus" lens, and as shown interposed between the poser represented by the circle A and the said pose-reflecting mirror.

Positioned slightly forward and to one side of the image-reducing lens 13 I locate a camera 14 which may be of any approved construction and type and which has the outer end of its lens-system 15 positioned within the forward end of the hood 12 and directed at the said pose-reflecting mirror so as to photograph therefrom the image of the poser A which passes through the image-reducing lens 13 before impinging thereon.

From the foregoing it will be seen that the poser A is enabled to see his image reflected in the pose-reflecting mirror from which the camera records the image on such reduced scale as to be readily observed or "taken in" at a glance.

The apparatus above described is particularly adapted for use when so-called "direct-positive" paper is employed in the camera 14, rather than the usual negative, since it will be obvious that the image reflected into the camera by the pose-reflecting mirror will be reversed so that when the said direct-positive paper is developed the image will appear correctly thereon rather than in reverse, as is usual with this type of paper.

In Fig. 2 of the drawings I have illustrated a form of apparatus particularly adapted for the production of the usual negatives.

In this apparatus I interpose a prism 16 between the outer end of the lens-system 15 of the camera 14 and the plate or film-compartment 17 thereof, so that the reversed image reflected from the mirror 10 will be again reversed before impinging upon the photo-sensitive material within the compartment 17.

In the construction just described it is also obvious that the poser may, as in the construction first described, observe the reduced-scale reflection of the image which the camera will record when it is operated for the purpose.

I thus provide a simple and convenient pose-reflecting system which enables the photograph to be recorded by the camera without the necessity of elaborate mechanisms which, when operated, startle and disconcert the poser, who meanwhile is able to accurately determine the character of the photograph which the camera will record.

It is obvious of course, without illustration, that if for any reason it is desired to change the angular disposition of the camera, prisms may be interposed between the outer end of the lens-system thereof and the said camera in accordance with well understood principles, so as to properly direct the reflection from the said mirror into the camera.

I claim:

1. A pose-reflecting system for photographic apparatus comprising a pose-reflecting surface positioned to reflect the image of a poser back to himself; a camera having its lens-system directed at the said reflecting-surface; and a reducing-lens interposed between the poser and the said reflecting-surface and hence also between the poser and the said camera; whereby a poser may observe in the said reflecting-surface a reduced-scale reflection of the image which the said camera will record from the said reflecting-surface, and whereby the reflected image of the poser is reduced by passing through the said reducing-lens to the said reflecting-surface for being recorded by the camera and again reduced by re-passing back through the said reducing-lens to the poser.

2. A pose-reflecting system for photographic apparatus comprising a pose-reflecting surface positioned to reflect the image of a poser back to himself; a camera having its lens-system directed at the said reflecting-surface; a reducing-lens interposed between the poser and the said reflecting-surface and hence also between the poser and the said camera; and a shield constructed and arranged to laterally envelop the light-paths between the said reflecting-surface, camera and reducing-lens to prevent the said reflecting-surface from reflecting light other than that passing through the said lens; whereby a poser may observe in the said reflecting-surface a reduced-scale reflection of the image which the said camera will record from the said reflecting-surface, and whereby the reflected image of the poser is reduced by passing through the said reducing-lens to the said reflecting-surface for being recorded by the camera and again reduced by re-passing back through the said reducing-lens to the poser.

In testimony whereof, I have signed this specification.

LUTHER G. SIMJIAN.